US010256766B2

United States Patent
Thomas

(10) Patent No.: US 10,256,766 B2
(45) Date of Patent: Apr. 9, 2019

(54) SOLAR PANEL INSTALLATION AND DIMENSION COMPENSATING RETENTION DEVICE

(71) Applicant: Marc M. Thomas, Mokelumne Hill, CA (US)

(72) Inventor: Marc M. Thomas, Mokelumne Hill, CA (US)

(*) Notice: Subject to any disclaimer, the term of this patent is extended or adjusted under 35 U.S.C. 154(b) by 0 days.

(21) Appl. No.: 15/076,569

(22) Filed: Mar. 21, 2016

(65) Prior Publication Data

US 2016/0204732 A1    Jul. 14, 2016

Related U.S. Application Data

(63) Continuation-in-part of application No. 13/633,040, filed on Oct. 1, 2012, now Pat. No. 9,299,868.

(51) Int. Cl.
   *H02S 20/30* (2014.01)
   *H02S 30/10* (2014.01)
   (Continued)

(52) U.S. Cl.
   CPC .............. *H02S 20/30* (2014.12); *F24S 25/33* (2018.05); *F24S 25/61* (2018.05); *F24S 25/636* (2018.05);
   (Continued)

(58) Field of Classification Search
   CPC ........ F24J 2/5266; F24J 2/5245; F24J 2/5264; F24J 2/5205; F24J 2/4636; F24J 2/5258; H01L 31/0422
   (Continued)

(56) References Cited

U.S. PATENT DOCUMENTS 4,319,844 A    3/1982  Auger
4,358,183 A   11/1982  Whiteford
(Continued)

FOREIGN PATENT DOCUMENTS

DE       10233973 A1    2/2004
DE    102009018362 A1   11/2010
(Continued)

OTHER PUBLICATIONS

Sharp Electronics Corporation (Solar Energy Solutions Group); Solar Power System Installation Manual; SRS Mounting System, Rectangular Modules; circa before Feb. 21, 2012; 44 pages.
(Continued)

*Primary Examiner* — Brian E Glessner
*Assistant Examiner* — Adam G Barlow
(74) *Attorney, Agent, or Firm* — Kolisch Hartwell

(57) ABSTRACT

A solar panel mounting system may include a solar panel mounting assembly for mounting to a support structure. The solar panel mounting assembly may include a restraining element, a retaining element and a biasing assembly that supports the restraining and retaining elements. The support structure may include an upper surface and a lower surface spaced from the upper surface. The biasing assembly may further include a biasing element that resiliently urges the retaining element toward a securing element for supporting a solar panel that is positioned between the retaining element and the upper surface of the support structure, and resiliently urges the restraining element toward the lower surface of the support structure. A retention device may resiliently bias the solar panels of a solar panel assembly together on a support structure.

5 Claims, 6 Drawing Sheets

(51) Int. Cl.
*F24S 25/61* (2018.01)
*H02S 20/00* (2014.01)
*F24S 40/80* (2018.01)
*F24S 25/33* (2018.01)
*F24S 25/70* (2018.01)
*F24S 25/636* (2018.01)
*F24S 25/00* (2018.01)

(52) U.S. Cl.
CPC ............... *F24S 25/70* (2018.05); *F24S 40/80* (2018.05); *H02S 20/00* (2013.01); *H02S 30/10* (2014.12); *F24S 2025/014* (2018.05); *F24S 2025/023* (2018.05); *F24S 2025/807* (2018.05); *Y02E 10/47* (2013.01); *Y02E 10/50* (2013.01); *Y10T 29/49355* (2015.01); *Y10T 403/60* (2015.01)

(58) Field of Classification Search
USPC ............ 248/274.1, 309.1; 136/251; 52/173.3
See application file for complete search history.

(56) References Cited

U.S. PATENT DOCUMENTS

| | | | |
|---|---|---|---|
| 5,762,720 | A | 6/1998 | Hanoka et al. |
| 6,465,724 | B1 | 10/2002 | Garvison et al. |
| 6,672,018 | B2 | 1/2004 | Shingleton |
| 8,839,573 | B2 * | 9/2014 | Cusson ................ F24S 25/636 52/173.3 |
| 2003/0070368 | A1 * | 4/2003 | Shingleton ............. F24J 2/5205 52/173.3 |
| 2008/0053517 | A1 | 3/2008 | Plaisted et al. |
| 2008/0095591 | A1 | 4/2008 | Wu |
| 2008/0169018 | A1 | 7/2008 | Miyamoto et al. |
| 2009/0114271 | A1 | 5/2009 | Stancel |
| 2009/0230265 | A1 | 9/2009 | Newman et al. |
| 2010/0018571 | A1 | 1/2010 | Placer |
| 2010/0065108 | A1 | 3/2010 | West et al. |
| 2010/0146899 | A1 * | 6/2010 | Zante .................... F24S 25/636 52/584.1 |
| 2010/0236610 | A1 | 9/2010 | Stancel et al. |
| 2010/0252092 | A1 | 10/2010 | Lenox |
| 2010/0294340 | A1 | 11/2010 | Cunningham et al. |
| 2011/0000525 | A1 | 1/2011 | Wu et al. |
| 2011/0100434 | A1 | 5/2011 | Van Walraven |
| 2011/0203637 | A1 | 8/2011 | Patton et al. |
| 2011/0209745 | A1 | 9/2011 | Korman et al. |
| 2011/0214365 | A1 | 9/2011 | Aftanas |
| 2011/0277296 | A1 | 11/2011 | Ramos |
| 2011/0290307 | A1 | 12/2011 | Workman et al. |
| 2012/0219309 | A1 | 8/2012 | Yoshioka |
| 2012/0244729 | A1 * | 9/2012 | Rivera ................... F24J 2/4638 439/97 |

FOREIGN PATENT DOCUMENTS

| | | | |
|---|---|---|---|
| EP | 2239783 | A1 | 10/2010 |
| EP | 2541161 | * | 6/2012 |
| WO | 03098126 | A1 | 11/2003 |

OTHER PUBLICATIONS

U.S. Receiving Office, International Search Report and Written Opinion of the International Searching Authority in PCT/US2013/061895, which is an international application that shares the same priority as this U.S. application; dated Feb. 18, 2014; 9 pages.

U.S. Patent and Trademark Office, Office action in U.S. Appl. No. 13/633,040, which is the U.S. application to which this application claims the benefit of priority; dated Aug. 27, 2014; 20 pages.

U.S. Patent and Trademark Office, Office action in U.S. Appl. No. 13/633,040, which is the U.S. application to which this application claims the benefit of priority; dated Apr. 3, 2015; 9 pages.

* cited by examiner

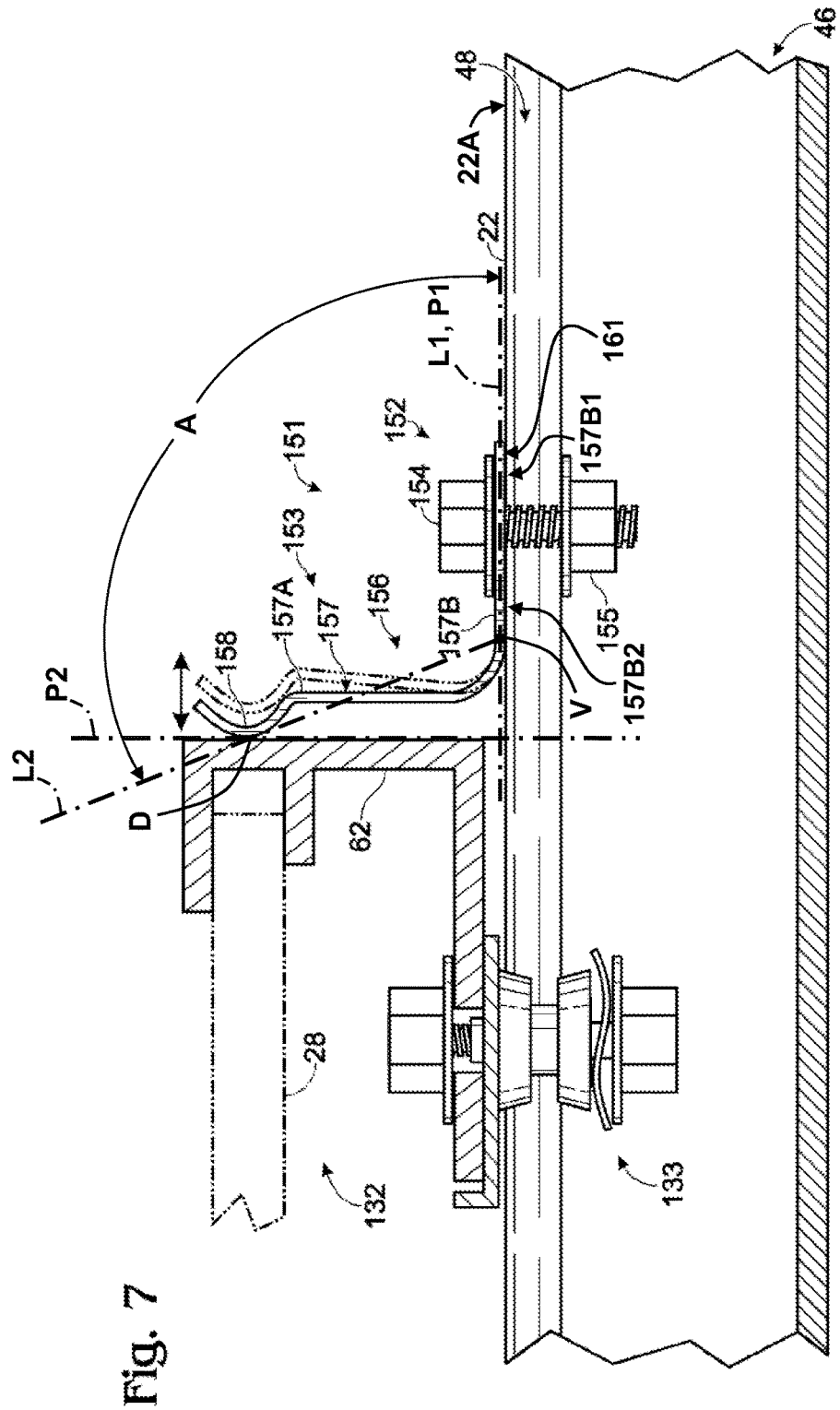

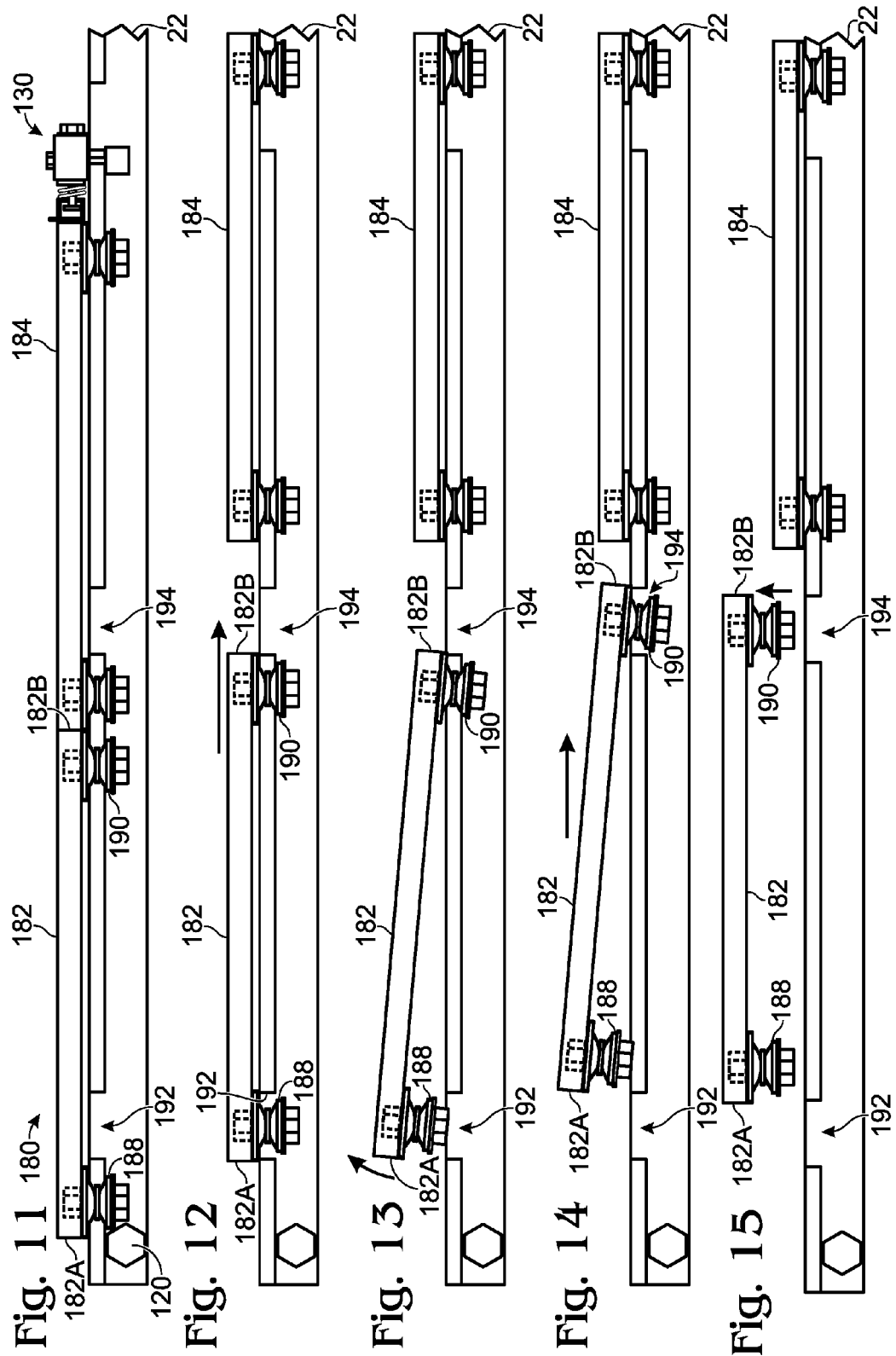

SOLAR PANEL INSTALLATION AND DIMENSION COMPENSATING RETENTION DEVICE

RELATED APPLICATION

This is a continuation-in-part of application Ser. No. 13/633,040, filed Oct. 1, 2012, which application is incorporated herein by reference in its entirety for all purposes.

TECHNICAL FIELD

The present inventions relate generally to the field of solar panels and mounting systems. More specifically, the present inventions relate to systems and methods for installing solar panels and for mounting solar panels.

BACKGROUND

Solar panels are mounted in a fixed position to racks or frames and often these rack-and-frame mounting systems require a substantial amount of preparation time and resources on-site before the solar panels may actually be installed. Each solar panel is attached at spaced positions to racks or structures that are secured to a foundation or structure. Each point of attachment is secured to the mounting point of a framed or unframed solar panel using mounting elements that fit in a track and are firmly secured by rotation or other means relative to the mounting frame. Several installers may be required to pick up, move and position the solar panel and mount the mounting elements and secure the solar panels to the rack. Positioning of large solar panels often involves awkward installer positioning or mechanized assistance. Each panel is mounted in its final position on the mounting frame or rack, and each panel is installed in a different position to maximize solar exposure to each panel. Framed and unframed solar panels and their mounting assemblies may be subject to stresses during installation and when installed in their fixed positions from natural elements and changes in ambient conditions over time.

SUMMARY

In an example, a retention device may include a base assembly, a contact member and a bias member. The base assembly may be configured to be fixedly mounted to the support structure. The bias member may be operatively coupled to the contact member and mounted to the base assembly for resiliently urging the contact member against a solar-panel assembly during use in a manner resisting movement of the solar-panel assembly toward the base assembly when the base assembly is mounted to the support structure with the contact member in contact with the solar-panel assembly.

An example of a method of mounting a solar panel to a support may include mounting each of a first plurality of mounting assemblies to a first solar panel; mounting the first plurality of mounting assemblies onto one or more elongate support rails; and sliding the first plurality of mounting assemblies along a length of the one or more support rails while the first solar panel is mounted on the first plurality of mounting assemblies.

BRIEF DESCRIPTION OF THE DRAWINGS

FIG. 7 is a cross-sectional view showing an example of another retention device.

FIG. 11 is a simplified cross-section of an example of showing two solar panels mounted on a support structure.

FIG. 12 is a diagram similar to FIG. 11 showing movement of the solar panels in preparation for removal of one end of a solar panel.

FIG. 13 is a diagram similar to FIG. 12 showing the one end of the solar panel removed from the support structure.

FIG. 14 is a diagram similar to FIG. 13 showing movement of the solar panel to a position in preparation for removal of a second end of the solar panel from the support structure.

FIG. 15 is a diagram similar to FIG. 14 showing the solar panel completely removed from the support structure.

DETAILED DESCRIPTION

Figure 1:
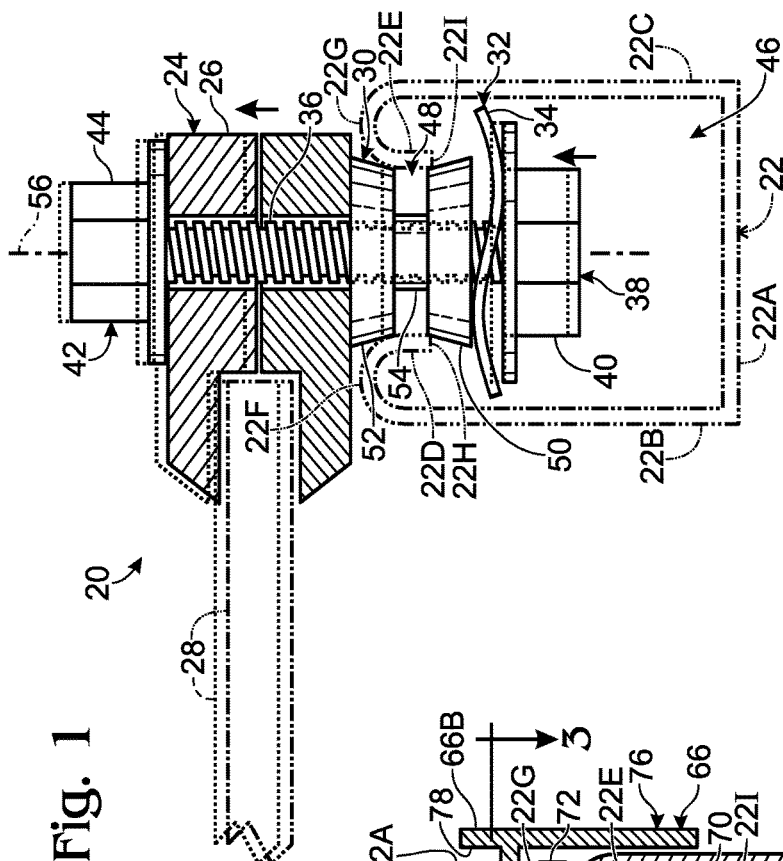
FIG. 1 is a partial cross-sectional view of an example of a solar panel mounting assembly configured for supporting the vertical position of a frameless solar panel.

A first example of a mounting assembly 20 for supporting a solar panel relative to a support structure 22, shown in phantom lines, is shown in a side cross section generally in FIG. 1. In this example, mounting assembly 20 includes a securing element 24 for supporting a solar panel in the form of a frameless solar panel bracket 26 for supporting a frameless solar panel 28. The mounting assembly may further include a guide assembly 30 and a biasing element 32 in the form of a spring washer 34. Mounting assembly 20 further includes a rod member 36, a restraining member 38 in the form of a lower tightening member 40 and a retaining member 42 in the form of an upper tightening member 44. In one example, threaded rod member 36 and lower tightening member 40 may comprise the threaded shaft and head of a bolt, and upper tightening member 44 may be a nut that is threadedly received on the bolt shaft.

Support structure 22 may have different configurations. In this example, the support structure has a bottom 22A that is mounted to an external foundation, not shown, and sides 22B and 22C forming a channel 46. This support structure 22 thus is in the form of an elongate rail having an upwardly open U shape in cross section as shown. The top of the sides of support structure 22 extend inwardly as opposing flanges 22D and 22E defining a narrowed elongate slot 48. In this example, the two inwardly bent flanges 22D and 22E have respective upper surfaces 22F and 22G and lower surfaces 22H and 22I spaced from the upper surfaces.

Guide assembly 30, in this example, may include a lower guide element 50, an upper guide element 52, and center element 54 disposed between the two guide elements. Elements 50, 52, and 54 are all ring shaped like washers having central openings through which rod member 36 passes. Guide elements 50 and 52 may be generally frustoconically, rounded, or beveled shaped, or otherwise taper from a larger diameter portion disposed outside of slot 48 to a smaller diameter portion disposed in slot 48 adjacent to center element 54 disposed entirely in the slot. The larger diameter portions are wider than the slot and the smaller diameter portions are narrower than the slot so that tapered region of guide element 50 contacts lower surfaces 22H and 22I of flanges 22D and 22E of the support structure and the tapered region of guide element 52 contacts upper surfaces 22F and 22G of the flanges.

During use, guide assembly 30 may function to center mounting assembly 20 in slot 48, as well as reduce friction by rotating around an axis 56 defined by rod member 36 when mounting assembly 20 is positioned on and moved along support structure 22 as described further below. Once in position on the support structure, spring washer 34 biases guide element 50 against the lower surface of the two inwardly bent flanges 22D and 22E. Correspondingly, spring washer 34, acting through tightening element 40, rod member 36, tightening element 44, and solar panel bracket 26, may bias guide element 52 against upper surfaces 22F and 22G of the two inwardly bent flanges.

Center element 54 may be positioned between lower guide element 50 and upper guide element 52. Center element 54 may be a bushing, washer or other type of bearing and may function to separate lower guide element 50 from upper guide element 52 to maintain a minimum separation between the guide elements, thereby facilitating insertion of the mounting assembly onto support structure 22. For certain shapes of guide elements 50 and 52, center element 54 may not be included. Additionally, as mounting assembly 20 is slid along slot 48 of support structure 22 with guide elements 50 and 52 in contact with upper surfaces 22F and 22 G and lower surfaces 22H and 22I of the flanges, center element 54 may reduce friction between the guide elements and the support structure surfaces by rotating with one or both of the guide elements around axis 56.

In this example, biasing element 32 is positioned between lower guide element 50 and lower tightening member 40. Biasing element 32 may be one or more spring washers 34, as shown, but may also be one or more springs, spring fingers or other resilient element. As mentioned, biasing element 32 may resiliently urge lower guide element 50 away from lower tightening member 40 and toward lower surfaces 22H and 22I of support structure 22.

Conversely, biasing element 32 may resiliently urge lower tightening member 40 away from guide element 50. This force, acting through rod member 36 and upper tightening member 44, biases the frameless solar panel bracket 26 downwardly against upper guide element 52 as well. An upward force, such as by manual manipulation of solar panel bracket 26, compresses biasing element 32 allowing the tightening members, rod member, and solar panel bracket to move upwardly slightly as shown by the dashed lines in FIG. 1. This reduces the pressure of guide element 52 on the upper surfaces of the support structure, facilitating movement of the bracket assembly normal to the plane of FIG. 1 along slot 48. Thus, the resilience provided by biasing element 32 allows vertical flexibility that allows absorption of physical stresses and accommodates tolerance variations during manufacture of the parts, while providing a sufficient amount of resilience to support the mounted solar panel on the support structure.

Figure 2:
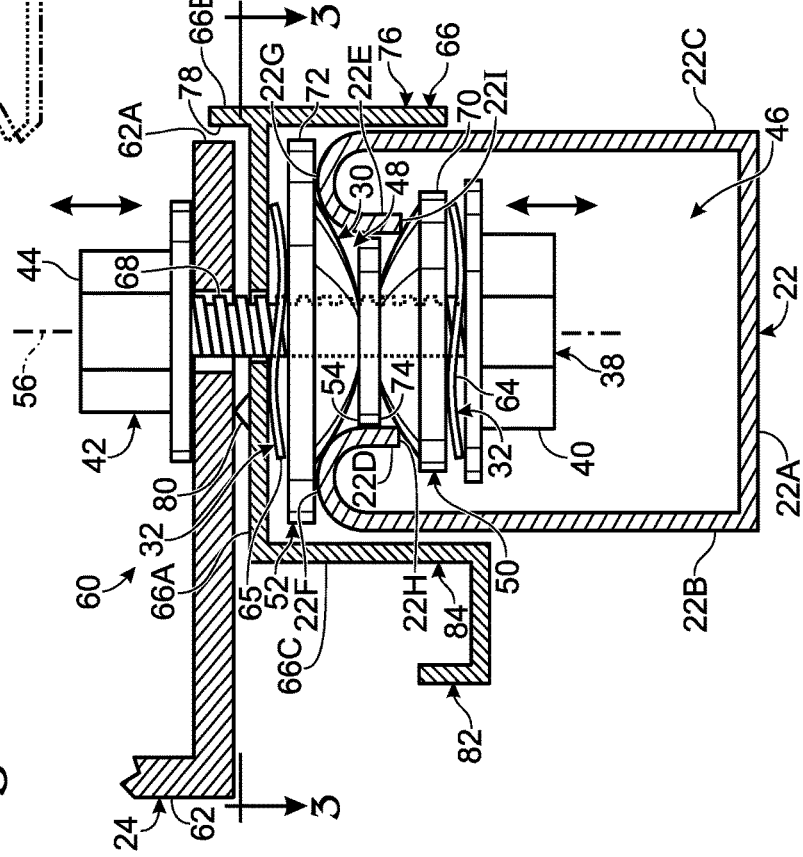
FIG. 2 is a partial cross-sectional view of a further example of a solar panel mounting assembly configured for a framed solar panel.

In another example, a mounting assembly for supporting a solar panel relative to a support structure 22 is shown generally at 60 in a side cross section in FIG. 2. In this example, mounting assembly 60 is shown mounting a securing element 24 for supporting a solar panel in the form of a framed solar panel bracket 62 to a support structure 22. The mounting assembly may include a guide assembly 30, one or more biasing elements 32, such as one or more spring washers 64, and an anti-rotation element 66.

Similar to the example shown in FIG. 1, mounting assembly 60 further includes a rod member 68, a restraining member 38 in the form of a lower tightening member 40 and a retaining member 42 in the form of an upper tightening member 44. Unlike the example shown in FIG. 1, rod member 68 may be D-shaped as to provide an anti-rotation function in conjunction with anti-rotation element 66, also shown in FIG. 3. Similar to the guide assembly shown in FIG. 1, in this example, guide assembly 30 may include a lower guide element 50 in the form of a rounded washer 70, an upper guide element 52 in the form of a rounded washer 72, and center element 54 in the form of a flat washer 74 disposed between the two guide elements.

In the same way described above, elements 50, 52, and 54 are all ring shaped like washers having central openings through which rod member 68 passes. Rounded washers 70 and 72 may be generally rounded and taper from a larger diameter portion disposed outside of slot 48 to a smaller diameter portion disposed in slot 48 adjacent to flat washer 74 disposed entirely in slot 48. The larger diameter portions are wider than slot 48 and the smaller diameter portions are narrower than slot 48 so that the tapered region of rounded washer 70 contacts lower surfaces 22H and 22I of flanges 22D and 22E of support structure 22, and the tapered region of rounded washer 72 contacts upper surfaces 22F and 22G of the flanges. Flat washer 74 may have a diameter equal to or less than the width of slot 48.

In this example, guide assembly 30 may function similar to the guide assembly described above, as to center mounting assembly 60 in slot 48 and reduce friction by rotating around an axis 56 defined by rod member 68 when mounting assembly 60 is positioned on and moved along support structure 22. Once guide assembly 30 is in the desired position on support structure 22, one or more biasing elements 32 may bias lower guide element 50 against lower surfaces 22H and 22I, as well as bias upper guide element 52 against upper surfaces 22F and 22G.

In this example, one or more biasing elements 32 may include a lower spring washer 64 and an upper spring washer 65, as shown. Lower spring washer 64 may be positioned between lower guide element 50 and lower tightening member 40. Upper spring washer 65 may be positioned between upper guide element 52 and anti-rotation element 66. Lower spring washer 64 may resiliently urge lower guide element 50 toward lower surfaces 22H and 22I of two inwardly bend flanges 22D and 22E and may resiliently urge lower tightening member 40 away from lower guide element 50. Since lower tightening member 40 may be affixed to rod member 68 and upper tightening member 44, lower spring washer 64 may bias downwardly rod member 68, upper tightening member 44, framed solar panel bracket 62, anti-rotation element 66, upper spring washer 65, and upper guide element 52.

In a similar but opposite effect, upper spring washer 65 may resiliently urge upper guide element 52 toward upper surfaces 22F and 22G of support structure 22 and may resiliently urge anti-rotation element 66, framed solar panel bracket 62, and upper tightening member 44 away from upper guide element 52. Since upper tightening member 44 may be affixed to rod member 68 and lower tightening member 40, upper spring washer 65 may bias upwardly rod member 68, lower tightening member 40, lower spring washer 64, and lower guide element 50. Thus, the resilience provided by spring washers 64 and 65 allow for vertical flexibility that allows absorption of physical stresses and accommodates tolerance variations during manufacture of the parts, while providing a sufficient amount of resilience to support the mounted solar panel on the support structure. The use of two biasing elements increases the range of resilient movement of the parts, accommodating a wider range of stresses and tolerance variations.

This example of the mounting assembly may further include an anti-rotation element 66, which may be supported between restraining element 38 and retaining element 42. An anti-rotation element 66 may have different configurations, but in this example anti-rotation element 66 may be positioned between framed solar panel bracket 62 and upper spring washer 65. Anti-rotation element 66 may include a base plate portion 66A having an aperture through which rod member 68 passes.

A side plate 66B extending from a peripheral edge of the base plate portion extends downwardly proximate to side 22C of the support structure, forming a first contact portion 76. Side plate 66B also extends upwardly from plate portion 66A proximate to an edge 62A of solar panel bracket 62, forming a second contact portion 78 for contacting framed solar panel bracket 62. During use, first contact portion 76 may prevent rotation relative to support structure 22, while second contact portion 78 may prevent rotation relative to framed solar panel bracket 62.

Anti-rotation element 66 may further include a ground contact element 80 and a ground mounting element 82. Ground contact element 80 may be a protrusion extending upwardly from the upper surface of base plate 66A of anti-rotation element 66. Ground contact element 80 may make operative contact with framed solar panel bracket 62 in order to create a ground connection between the solar panel frame and the anti-rotation element.

The anti-rotation element may include a J-shaped lug 66C extending downwardly along side 22B of the support structure from base plate 66A opposite side plate 66B. The J-shaped lug may provide a ground mounting element 82 for connecting circuit grounds to the solar panel frame through the anti-rotation element. Ground mounting element 82 may further provide a third contact portion 84 extending along support-structure side 22B for contacting support structure 22 when the anti-rotation element is rotated about axis 56. Third contact portion 84 may further assist in preventing rotation of anti-rotation element 66 relative to support structure 22. For certain applications of anti-rotation element 66, ground contact element 80, and ground mounting element 82 may not be included.

Figure 3:
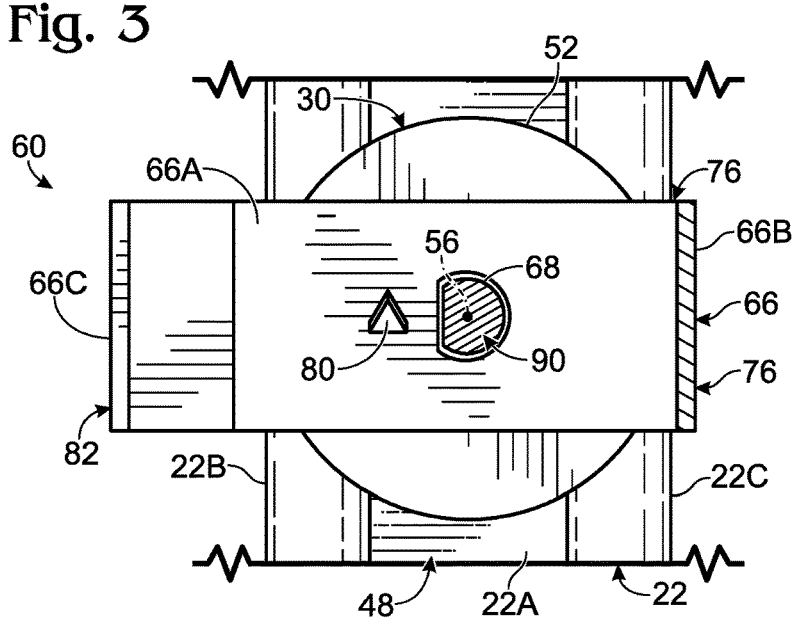
FIG. 3 is a cross-sectional view of the solar-panel mounting assembly taken along line 3-3 of FIG. 2.

FIG. 3 shows a cross section of mounting assembly 60 taken along lines 3-3 of FIG. 2. In this view, the top of anti-rotation member 66 is seen over upper guide element 52 disposed on support structure 22. Anti-rotation element 66 is seen to include a D-shaped opening 90 through which D-shaped rod member 68 extends. As a result, rod member 68 and anti-rotation element 66 may be unable to rotate relative to each other. As previously described in FIG. 2, side plate 66B of anti-rotation element 66 may extend down along side 22C of support structure 22 to provide first contact portion 76 for contacting support structure 22.

In certain applications, such as this example, that include a ground mounting element 82, J-shaped lug 66C of anti-rotation element 66 may extend down along side 22B of support structure 22, to provide a third contact portion 84 for contacting support structure 22. Accordingly, anti-rotation element 66 may be prevented from rotating relative to support structure 22 and D-shaped rod member 68 may be prevented from rotating relative to anti-rotation element 68. Therefore, D-shaped rod member 68 may be prevented from rotating relative to support structure 22 and furthermore preventing the tightening members, shown in FIG. 2 and which are affixed to D-shaped rod member 68, from rotating loose as elements in guide assembly 30 rotate around axis 56 defined by D-shaped rod member 68 during movement of mounting assembly 60 along slot 48 of support structure 22. It will be appreciated that anti-rotation member 66 would prevent rotation of solar panel securing element 24 relative to support structure 22. This function may be provided when the anti-rotation member has a circular opening in which rod member 68 is free to rotate.

As previously described, mounting assemblies 20 and 60 for supporting a solar panel relative to a support structure 22 shown in FIG. 1 and FIG. 2 may be incorporated in a solar panel assembly. For example, a solar panel assembly 100 is shown generally in FIG. 4. In this example, solar panel assembly 100 may include a solar panel 28, a solar panel frame 62, and one or more mounting assemblies 102 for supporting solar panel 28 relative to one or more support structures 22. The support structures may be affixed to a foundation or base 104 by a suitable fastening device, such as fastening screws 105.

In this example, mounting assemblies 102 may each include a guide assembly 30, a biasing element 32, such as a compression spring 106, and an anti-rotation element 107. Anti-rotation element 107 is preferably constructed with one or more features as described above with regard to anti-rotation member 66. Each mounting assembly 102 may further include a rod member 36, a retaining member 42 in the form of upper tightening member 44, and a restraining member 38. In this example restraining member 38 is in the form of a lower grooved tightening member 108.

Guide assembly 30 may include a lower guide element 50 in the form of lower tightening member 108, an upper guide element 52 in the form of a tapered washer 110, and a center element 54 in the form of a cylindrical washer 112 disposed between the two guide elements. In the same way described above, elements 52 and 54 are ring shaped like washers having central openings through which rod member 36 passes.

Lower grooved tightening member 108 may have one or more parallel, such as grooves 114, 116 sized and positioned to slidingly receive the two downwardly extending flanges 22D and 22E terminating in lower surfaces 22H and 22I. Tapered washer 110 may generally taper from a larger diameter portion disposed outside of slot 48 to a smaller diameter portion disposed in slot 48 adjacent to cylindrical washer 112 disposed entirely in slot 48 between upper tightening member 44 and lower tightening member 108. The larger diameter portions of washer 110 are wider than slot 48 and the smaller diameter portions are narrower than slot 48 so that the tapered region of tapered washer 110 contacts upper surfaces 22F and 22G of the flanges.

Guide assembly 30 may function similar to the guide assembly described above, to center mounting assembly 60 in slot 48. However in this example the guide assembly may reduce friction during the rotation of tapered washer 110 and cylindrical washer 112 around axis 56 as the mounting assembly is slid along the two inwardly bent flanges 22D and 22E. During movement of the mounting assembly, the lower edges of flanges 22D and 22E slide along respective grooves 114, 116 Once mounting assemblies 102 are in the desired positions on support structures 22, biasing element 32 biases tapered washer 110 against upper surfaces 22F and 22G, and biases lower grooved tightening member 108 against lower surfaces 22H and 22I of the support structure flanges.

Biasing element 32 may be a compression spring 106, as shown, or other suitable biasing device and may be positioned between tapered washer 110 and anti-rotation member 107, if it is used, or solar panel frame 62. Compression spring 106 may resiliently urge tapered washer 110 toward upper surfaces 22F and 22G of support structure 22 and may resiliently urge solar panel frame 62 and upper tightening member 44 away from tapered washer 110. Since upper tightening member 44 may be affixed to rod member 36 and lower grooved tightening member 108, compression spring 106 may bias upwardly rod member 36 and lower grooved tightening member 108 as well. This retains the lower edges of flanges 22D and 22E in grooves 114 and 116. Thus, the resilience provided by compression spring 106 allow for vertical flexibility that allows absorption of physical stresses and accommodates tolerance variations during manufacture of the parts, while providing a sufficient amount of resilience to support and retain the mounted solar panel on the support structure.

Figure 5:
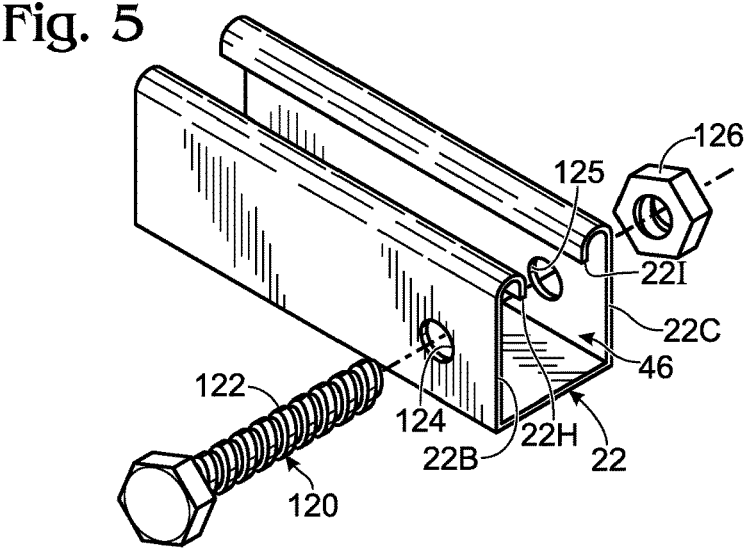
FIG. 5 is an exploded view showing a support structure and a contact member.
Figure 9:
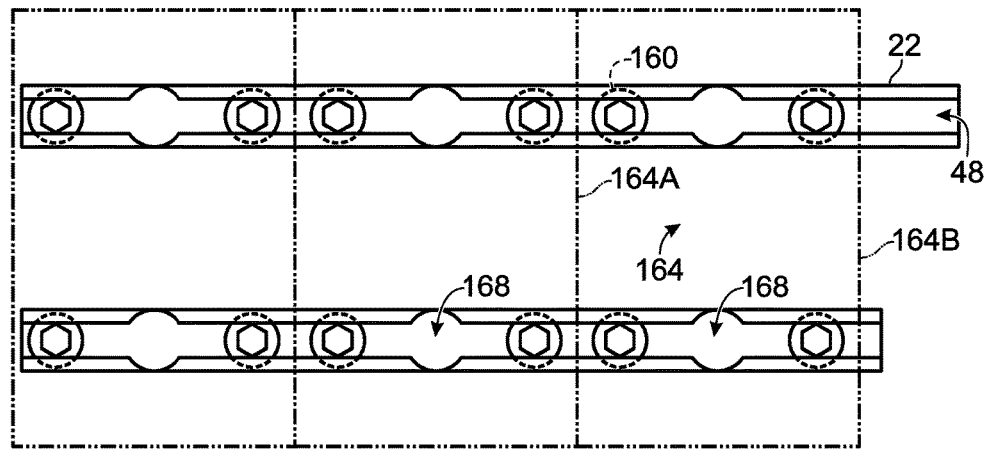
FIG. 9 is a view similar to FIG. 8 showing the array of solar panels in a seated position on the support structure.

FIG. 5 shows a stop member 120 mounted to a support structure 22. In this example, stop member 120 may include a bolt 122 that may be positioned in aligned openings 124 and 125 in respective sides 22B and 22C of support structure 22. When in position, bolt 122 extends across channel 46. Bolt 122 may be secured by a nut 126, as shown. Stop member 120 is positioned to prevent a mounting assembly mounted on support structure 22 from moving along slot 48 past the stop member. As shown in FIG. 9, below, the stop member establishes the end position of a mounting assembly in the support structure. Any suitable structure that limits the travel of a mounting assembly in the support structure may be used.

Figure 6:
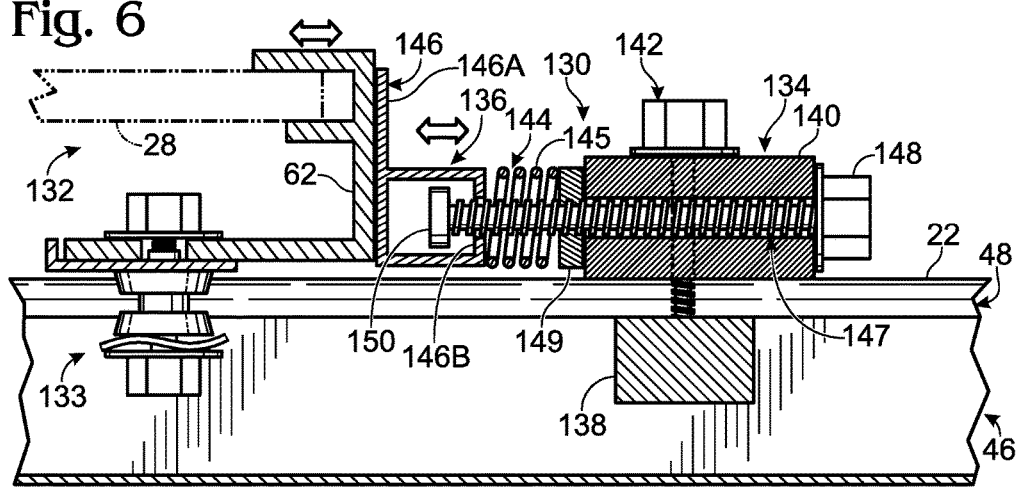
FIG. 6 is a cross-sectional view showing an example of a retention device in operative contact with an edge of a solar panel, supported by a solar-panel mounting assembly similar to the mounting assembly of FIG. 1, the retention device retaining the solar panel in a horizontal position.

In another example, a retention device 130 may be used to limit the movement of a solar panel assembly 132 along support structure 22, as shown in a side cross section in FIG. 6. As discussed previously, solar panel assembly 132 may include a solar panel 28, a solar panel frame 62, and a mounting assembly 133. Retention device 130 may include a base assembly 134, and a stop assembly 136.

Base assembly 134 may include a lower mounting element 138, an upper base element 140, and a bolt 142. The lower mounting element may have a threaded bore into which a shaft of bolt 142 is screwed. Upper base element 140 may correspondingly have a bore through which shaft of bolt 142 freely passes. Lower mounting element 138 may be in the form of a block or other structure having a width wider than slot 48 but narrow enough to fit within channel 46 of support structure 22. The upper base element is of a size suitable for being supported on the flanges of support structure 22.

In this example, base assembly 134 supports the stop assembly in a fixed position on support structure 22. Stop assembly 136 may include a bias member 144, such as a spring 145 or other suitable biasing device, a contact member 146, and a base arm 147, such as a shaft of a threaded bolt 148. Base arm 147 extends freely through a bore in upper base element 140 in line with the length of support structure 22 and is secured in position in upper base element 140 by a nut 149.

Contact member 146 may be any structure suitable for applying a restraining force from bias member 144 against solar panel frame 62. In this example, contact member 146 includes a first plate portion 146A that presses against the solar panel frame and a second plate portion 146B spaced from the first plate portion and having an opening through which base arm 147 freely extends. An end of base arm 147 is disposed between first and second plate portions 146A and 146B, and is retained in this region by a retention element 150, such as a nut threadedly mounted on the end of the base arm. Spring 145 is held in compression between nut 149 and second plate portion 146B. Spring 140 may resiliently urge contact member 146 away from base assembly 134 along support structure 22. Since base assembly 134 may be fastened to support structure 22, spring 145 may bias contact member 146 against solar panel assembly 132.

During use, retention device 130 may be slid along elongate slot 48 of support structure 22 until contact member 146 comes into contact with solar panel assembly 132. Once retention device 130 is in the desired position on support structure 22, base assembly 134 may be fastened to support structure 22. With retention element 150 positioned in an intermediate position between first and second plate portions 146A and 146B of contact member 146, the solar panel assembly can move either direction along support structure 22 and still be held in tension. Thus, the resilience provided by biasing element 144 allows lateral flexibility along elongate slot 48 of support structure 22 that accommodates thermal expansion and contraction of solar panels in the solar panel assembly or an array of solar panel assemblies, as well as absorption of physical stresses produced by ambient conditions, while providing a sufficient amount of force to maintain the general relative positions of solar panels in solar panel assembly 132 that are mounted on a common support structure 22 and keep them in contact with each other.

In yet another example, a retention device 151 may be used to limit the movement of a solar panel assembly 132 along support structure 22, as shown in a side cross section in FIG. 7. Retention device 151 may include a base assembly 152, and a stop assembly 153. Base assembly 152 may include a bolt 154 and a lower mounting element 155, such as a nut. Lower mounting element 155 may have a threaded bore into which a shaft of bolt 142 is screwed. In this example, base assembly 152 supports stop assembly 153 in a fixed position on support structure 22.

Stop assembly 153 may include a bias member 156, such as a spring 157 or other suitable biasing device, and a contact member 158. Contact member 158 may be any structure suitable for applying a restraining force from bias member 156 against solar panel frame 62. In this example, stop assembly 153 is a unitary element made of a continuous strip of metal. Spring 157 is a flat spring having an end 157A attached to contact member 158. Contact member 158 is a curved portion of stop assembly 153 that has a convex surface facing solar panel frame 62. An opposite end 157B is formed as a foot that is attached to base assembly 152, and thereby during use to support structure 22, as described above with reference to FIG. 6.

Spring end 157B accordingly extends from spring end 157A and has a lower mounting surface 161, as shown in FIG. 7, that contacts a corresponding upper surface 22A of support structure 22 during use. Being flat, spring end 157B is planar and can be said to extend along a plane P1 perpendicular to the plane of view of FIG. 7. Plane P1 is shown as an edge view in the figure and illustrated by a straight mounting line L1 parallel to mounting surface 161. Spring end 157B can be said to extend along mounting line L1 on plane P1 from a distal portion 157B1 of spring end 157B opposite and distal spring end 157A to a proximal portion 15762 of spring end 157B proximal spring end 157A.

As is shown in FIG. 7, spring end 157A supports contact member 158 with the contact member extending from spring end 157A distal spring end 157B. Contact member 158 extends to a distal position D that is on a plane P2 perpendicular to mounting line L1 and plane P1. It is seen that plane P2 is spaced from spring end 157B and is located on mounting line L1 at a point that is furthest from spring end 157B at which plane P2 intersects or is aligned with contact member 158. This furthest point (to the left as seen in FIG. 7) where plane P2 intersects contact member 158 is identified as distal position D. As can be seen, plane P2 corresponds to an end surface of solar panel frame 62 as shown in FIG. 7 that contacts contact member 158 during use and is also perpendicular to the plane of view of FIG. 7.

As shown in FIG. 7, the surface of contact member 158 as viewed from plane P2 is seen to have a convex shape. Distal position D of the contact member is on the convex surface. The continuous resilient material of flat spring 157 ends with the convex surface of the contact member. Accordingly and as is also shown in the view of FIG. 7, contact member 158 has a terminal end that is distal spring 157 and that extends only away from plane P2.

It is seen that distal position D of contact member 158 is located at an obtuse angle A relative to mounting line L1 at proximal portion 157B2 of spring end 157B, shown a angle vertex V. Mounting line L1 thus forms one side of angle A. For ease of illustration, a second side of angle A is shown as a line L2 that extends from vertex V through distal position D on contact member 158. Angle A is seen to be the angle of the distal position D relative to mounting line L1 at spring end 157B when viewed from the plane of view of FIG. 7.

During use, retention device 151 may be slid along elongate slot 48 of support structure 22 until contact member 158 comes into contact with solar panel frame 62 or other member of solar panel assembly 132. Once retention device 151 is in the desired position on support structure 22, base assembly 152 may be fastened to support structure 22. With contact member 158 positioned in an intermediate position with spring 157 between a relaxed state and a fully deflected state, the solar panel assembly can move either direction along support structure 22 and still be held in tension. For example, when the solar panel assembly expands under ambient conditions, solar panel frame 62 moves to the right as shown in FIG. 7 deflecting contact member 158 to the right as shown by the dash-double-dot line of stop assembly 153. Thus, the resilience provided by bias member 156 allows lateral flexibility along elongate slot 48 of support structure 22. This accommodates thermal expansion and contraction of solar panels in the solar panel assembly or an array of solar panel assemblies, as well as absorption of physical stresses produced by ambient conditions.

Bias member 156 provides a sufficient amount of force to maintain the general relative positions of solar panels in solar panel assembly 132 that are mounted on a common support structure 22 and keep them in contact with each other. It may further be noted that with the structure of stop assembly 153 shown, when bias member 156 is fully deflected, solar panel frame 62 seats against the substantially rigid bend in spring 157 adjacent foot end 157B, preventing further movement of the edge of solar panel assembly 132 toward base assembly 152.

Figure 10:
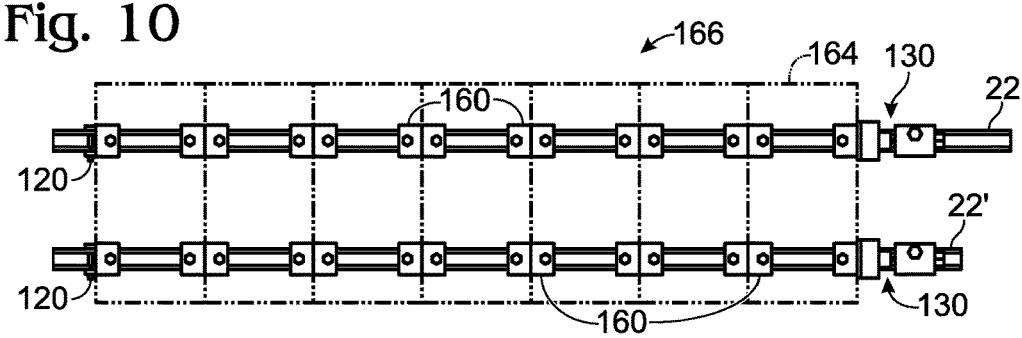
FIG. 10 is a simplified top view of an array of solar panels mounted on a support structure with mounting assemblies and retention devices.
Figure 4:
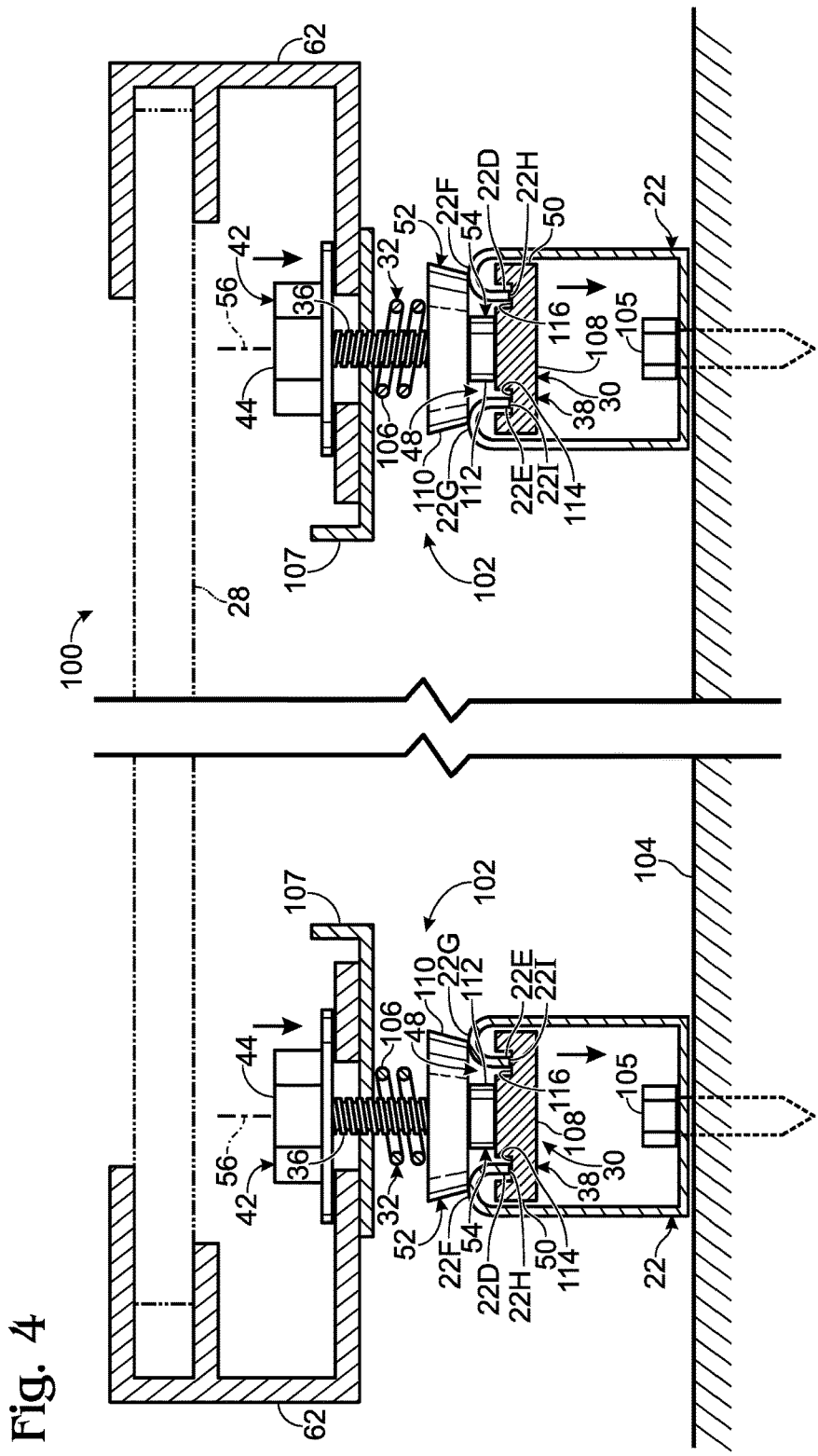
FIG. 4 is a partial cross-sectional view showing yet a further example of solar-panel mounting assemblies supporting a solar panel.
Figure 8:
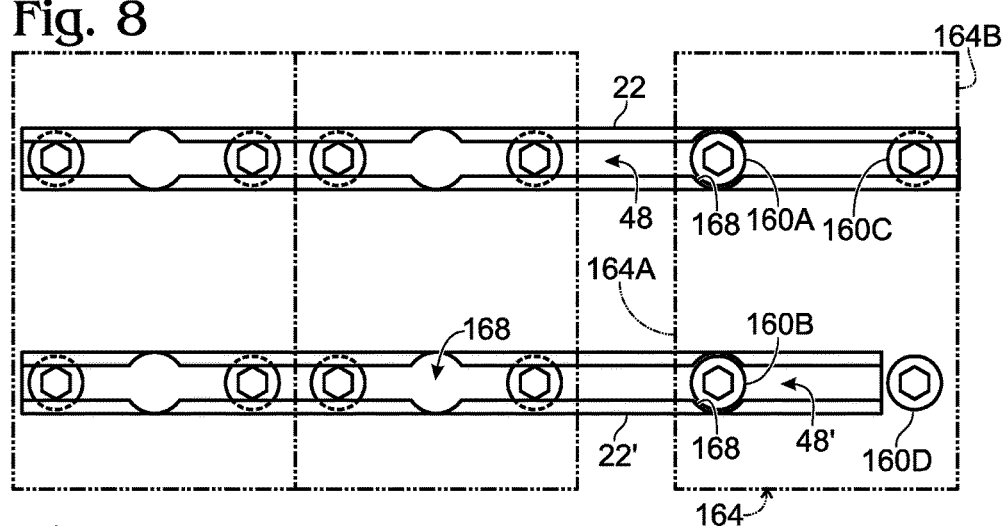
FIG. 8 is a simplified top view showing an example of an array of solar panels during installation on a support structure.

A first method of mounting a solar panel assembly 164 to a support structure 22 is shown generally in FIGS. 8-10. The method of mounting a solar panel assembly 164 to a support structure 22 may include mounting one or more mounting assemblies 160, such as mounting assemblies 20, 60, or 102 described previously, to a solar panel assembly 164. In this example, mounting assemblies 160A, 160B, 160C, and 160D are attached to each solar panel assembly 164 at suitably spaced locations, as shown. It will be noted that two support structures 22 and 22' having respective lengthwise slots 48 and 48' are used in this example to mount the solar panels. Support structure 22 extends further to the right than support structure 22'. The solar panel is mounted by first inserting mounting assembly 160A on support structure 22, as shown in FIG. 4. Mounting assembly 160A is then moved to the left by moving solar panel assembly 164 to the left until mounting assembly 160B is aligned with slot 48' of support structure 22'. Both mounting assemblies 160A and 160B are then slid to the left in the respective slots by moving solar panel assembly 164 to the left until mounting assembly 160C is aligned with slot 48. Mounting assembly 160C is then inserted onto support structure 22 and the solar panel shifted further to the left until mounting assembly 160D is aligned with slot 48'. The fourth and final mounting assembly for solar panel assembly 164 is then inserted onto support structure 22'. Solar panel assembly 164 may then be moved into a desired position along support structures 22 and 22' by sliding the mounting assemblies along the support structure slots, such as to the position shown in FIG. 9.

An assembled array 166 of solar panel assemblies 164 is illustrated in FIG. 10. In this example, array 166 includes 7 solar panel assemblies. Each solar panel assembly is mounted to support structures 22 and 22' by four mounting assemblies 160. The array is maintained in position on the support structures by stop members 120 on the left ends of the support structures and by retention devices 130 on the right ends of the support structures as shown. The array may be disassembled by reversing these steps.

A second method of mounting solar panel assembly 164 takes advantage of support structures that have enlarged openings 168 in slot 48 at spaced positions along the support structures. In this example, there is an opening 168 at each solar panel assembly position. Rather than inserting the solar panel assemblies from one end of the support structures, as described above, the solar panel assemblies may be installed on the support structures close to the final position of each solar panel assembly. Mounting assemblies 160 and openings 168 are sized so that the portion of the mounting assemblies disposed in channel 46 are able to pass freely down through openings 168 normal to slot 48. For illustration purposes, mounting assemblies 160 in FIGS. 8-9 may only show a washer or part of mounting assembly 160 that is positioned in channel 46 to illustrate the use of the openings.

This is illustrated in FIG. 8 in which the right-most solar panel assembly 164 is positioned with mounting assemblies 160A and 160B aligned with corresponding openings 168 in respective support structures 22 and 22'. In this example, mounting assembly 160C may be installed in support structure 22 prior to inserting support structures 160A and 160B into the openings. Optionally, mounting assembly 160C may be installed on support structure 22 subsequent to inserting support structures 160A and 160B into the openings by moving the solar panel assembly to the right far enough to mount mounting assembly 160C on support structure 22, followed by mounting assembly 160D.

The mounting of one or more mounting assemblies 160 to a solar panel assembly 164 may also be performed and prepared off-site, allowing for a rapid on-site installation process. Once the desired number of solar panel assemblies 164 are mounted, one may fix them in position by mounting one or more resilient devices 130 and/or stop members 120 to the one or more ends of solar panel assemblies 164 on support structure 22 as shown in FIG. 10, providing an on-site installation requiring few tools and a low level of skill.

In another example, a method of removing a solar panel assembly from a support structure 22 is shown generally in FIGS. 11-15. FIG. 11 shows an array 180 of solar panel assemblies, including solar panel assemblies 184 and 186 mounted to support structures 22 and affixed by mounting assemblies such as mounting assemblies 188 and 190 for solar panel assembly 184. Array 180 is held in position by stop members 120 and retention devices 130 mounted to support structures 22.

The method of removing solar panel assembly 184 from support structure 22 may include removing a retention devices 130 or stop member 120, and sliding any necessary solar panel assemblies, such as solar panel assembly 186, sufficiently far away from solar panel assembly 184 to allow solar panel assembly 184 to be moved to a position where mounting assembly 188 is aligned with an opening 192, as shown in FIG. 12. A first end 182A of solar panel assembly 182 is then lifted out of an opening 192 in slot 48 of support structure 22, as shown in FIG. 13. Solar panel assembly 182 is then slid along support structure 22 until mounting assembly 190 is aligned with a second opening 194 in slot 48, as shown in FIG. 14. Second end 182B of solar panel assembly 184 is then lifted out of second opening 194, as shown in FIG. 15, freeing solar panel assembly 182 from the support structure. This process may then be reversed to replace or install solar panel assembly 182 on support structure 22, making maintenance of array 180 of solar panel assemblies a relatively simple process.

This description is illustrative and directed to the apparatus and/or method(s) described, and is not limited to any specific invention or inventions. The claims that are appended to this description, whether now or later in this or a subsequent application, define specific inventions included in the described apparatus and or methods. No single feature or element, or combination thereof, is essential to all possible combinations that may now or later claimed. While examples of apparatus and methods are particularly shown and described, many variations may be made therein. Such variations, whether they are directed to different combinations or directed to the same combinations, whether different, broader, narrower or equal in scope, are also regarded as included within the subject matter of the present disclosure. An appreciation of the availability, scope or significance of various inventions may not be presently realized. Thus, any given invention disclosed by example in the disclosure does not necessarily encompass all or any particular features, characteristics or combinations, except as specifically claimed.

Where "a" or "a first" element or the equivalent thereof is recited, such usage includes one or more such elements, neither requiring nor excluding two or more such elements. Further, ordinal indicators, such as first, second or third, for identified elements are used to distinguish between the elements in the order in which they are introduced, and do not indicate a required or limited number of such elements, and do not indicate a particular position or order of such elements unless otherwise specifically indicated. Accordingly, the ordinal indicator used for a particular element may vary in different contexts.

The invention claimed is:

1. A retention device for use with a support structure supporting a solar-panel assembly that is movable relative to the support structure, the retention device comprising:
    a contact member;
    a resilient spring having a first end and a planar second end wherein the second end extends along a first plane and extends from the first end, the second end has a mounting surface extending along the first plane, the second end extends along a straight mounting line on the first plane from a distal portion of the second end opposite the first end to a proximal portion of the second end proximal the first end, the first end supports the contact member with the contact member extending from the first end distal the second end, the contact member extends to a distal position that is on a second plane perpendicular to the mounting line, the second plane is spaced from the second end and is located on the mounting line at a point that is furthest from the second end at which the second plane intersects the contact member, the distal position of the contact member is disposed at an obtuse angle to the mounting line at the proximal portion of the second end when the angle is viewed from a third plane perpendicular to the first and second planes; and
    a base assembly configured to fixedly mount the second end to a support structure with the mounting surface on a support surface of the support structure.

2. The retention device of claim 1, wherein the spring is a flat spring, and the flat spring and the contact member are made of a single continuous resilient material.

3. The retention device of claim 2, wherein the contact member forms a convex surface as viewed from the second plane, the distal position of the contact member is on the convex surface, and the continuous resilient material ends with the convex surface of the contact member.

4. The retention device of claim 1, wherein the contact member has a terminal end distal the spring that extends only away from the second plane.

5. The retention device of claim 1, wherein the contact member extends closer to the second plane than the spring and base assembly.

* * * * *